United States Patent
Suzuki et al.

(10) Patent No.: US 6,193,140 B1
(45) Date of Patent: Feb. 27, 2001

(54) HEAT EXCHANGER CORE BASED ON ALUMINUM AND PROCESS FOR PRODUCING THE SAME

(75) Inventors: Toshihiro Suzuki, Numazu; Tsunehiko Tanaka, Fuji; Meitoku Ogasawara, Fuji; Yoshito Oki, Fuji, all of (JP)

(73) Assignee: Alcan International Limited, Montreal (CA)

( * ) Notice: Subject to any disclaimer, the term of this patent is extended or adjusted under 35 U.S.C. 154(b) by 0 days.

(21) Appl. No.: 09/341,589
(22) PCT Filed: Jan. 21, 1998
(86) PCT No.: PCT/JP98/00203
§ 371 Date: Jul. 13, 1999
§ 102(e) Date: Jul. 13, 1999
(87) PCT Pub. No.: WO98/33034
PCT Pub. Date: Jul. 30, 1998

(30) Foreign Application Priority Data

Jan. 24, 1997 (JP) ...................................... 9-24559

(51) Int. Cl.$^7$ .................................. B23K 31/02
(52) U.S. Cl. ......................... 228/183; 228/182; 228/214; 228/193
(58) Field of Search .................................. 228/183, 182, 228/178, 214, 193; 148/437; 165/177, 180, 133; 420/540; 428/544

(56) References Cited

U.S. PATENT DOCUMENTS

| 4,831,701 | 5/1989 | Yutaka | ..................................... 29/157 |
| 5,148,862 | 9/1992 | Hashiura et al. | .................. 165/134.1 |

FOREIGN PATENT DOCUMENTS 32 06 298 A1  7/1983  (DE).

OTHER PUBLICATIONS

Patent Abstract of Japan, vol. 8, No. 197 (M–324), Sep. 11, 1984, publication number JP59086899.
Patent Abstract of Japan, vol. 017, No. 059 (M–1363), Feb. 5, 1993 in the English Abstract of JP 04 270058.

Primary Examiner—Patrick Ryan
Assistant Examiner—M. Alexandra Elve
(74) Attorney, Agent, or Firm—Heslin & Rothenberg, P.C.

(57) ABSTRACT

By the use of a heat exchanger tube not required for adhesion of Zn in advance and a fin not clad with a brazing composition, a heat exchanger core is provided which has corrosion resistance and brazing capability comparable to or higher than those of the conventional counterpart. Applied onto an outer surface of an extruded flattened tube as a heat exchanger tube is a brazing composition derived from a mixture of silicon and fluorine type flux, and a fin formed of an aluminum-based zinc-containing material is prepared. The extruded flattened tube and the fin are then heated at a given temperature so that the same are brought into brazed relation to each other, and a mixed diffusion layer of silicon and zinc is then on the outer surface of the extruded flattened tube.

2 Claims, 3 Drawing Sheets

HEAT EXCHANGER CORE BASED ON ALUMINUM AND PROCESS FOR PRODUCING THE SAME

TECHNICAL FIELD

This invention relates to a heat exchanger core based on aluminum and also to a process for producing the same. More particularly, the invention relates to a heat exchanger core based on aluminum in which an aluminum-based flattened heat exchanger tube, for example, and an aluminum-based fin are held in brazed relation to each other by the use of a brazing composition. The invention further relates to a process for the production of such heat exchanger core.

BACKGROUND ART

In general, a certain heat exchanger based on aluminum has been widely used which is constructed with a heat exchanger tube formed of aluminum or an aluminum alloy (hereafter referred to as being based on aluminum) and an aluminum-based fin brazed with each other. Further and to gain improved heat exchange efficiency, an extruded flattened tube has been employed as a heat exchanger tube, which extruded flattened tube is derived from an extruded shape based on aluminum.

For the resultant heat exchanger to be proof to corrosion (resistant to corrosion), zinc (Zn) has generally been caused to adhere to the flat heat exchanger tube on its outer surface, followed by diffusion of Zn over the outer surface of such flat tube during brazing with heat and by subsequent formation of a Zn diffusion layer thereover. Additionally, the fin has been prepared from a brazing sheet chosen from among those materials clad with a Zn-containing brazing material, namely of a brazing composition. As a like instance, U.S. Pat. No. 4,831,701 discloses a method in which an aluminum-based fin clad on its surface with a brazing composition derived from Al—Si alloy and flux coated with Zn are applied to and brazed with the flat heat exchanger tube.

Such a brazing sheet for use in fin preparation, however, is costly as compared to a blank fin material not clad with a brazing material. Moreover, because of the cladding on its surface with a brazing material, the brazing sheet leads to rapid abrasion of a fin working roll, thus needing frequent polishing of such working roll. As a further problem, flashes or burrs tend to take place when in working of a louver or the like with eventual quality deterioration of the finished heat exchanger core. Furthermore, by the method of U.S. Pat. No. 4,831,701, process of coating flux with Zn is responsible for increased process step and hence for added production cost and material cost.

In order to improve the corrosion resistance of the flat heat exchanger tube, a method has been employed in which zinc (Zn) is made adherent in advance to an outer surface of such flat tube as by a zincate method or a spray coating of Zn, and a Zn diffusion layer is then formed in the course of brazing so that the flat tube is prevented against corrosion by electrode shielding. However, this method leaves the problem that Zn adhesion is rather tedious and time-consuming.

On the other hand, a method is known in which a blank fin material not clad with a brazing material is put to use and in which a powdered Al—Si alloy derived from aluminum (Al) and silicon (Si) is applied to and brazed with a flat heat exchanger tube. Such known method needs for the powdered Al—Si alloy to be coated in a markedly large amount and hence poses those drawbacks related to cost and assembly. By another known method, a flat heat exchanger tube is prepared from an electrically welded tube clad with a brazing material. For example, JP59086899 discloses a method in which an aluminum-based heat exchanger tube clad on its surface with a brazing composition derived from Al—Si alloy is put to use and in which aluminum-based fin containing Zn applied to and brazed with the flat heat exchanger tube. In this and last method, however, an insert is required to be disposed internally of such tube when rendered multi-channel, and this is responsible for increased process step and hence for added production cost and material cost.

SUMMARY OF THE INVENTION

The present invention has been made and completed with the aforementioned situation in view. One object of the invention is to provide a heat exchanger core which results from use of a heat exchanger tube not needed for adhesion of Zn in advance and a blank fin material not clad with a brazing composition and which exhibits corrosion resistance and brazing capability comparable to or higher than those of the conventional equivalent. Another object of the invention is to provide a process for the production of such heat exchanger core.

To achieve the above noted objects, the invention is directed to a heat exchanger core based on aluminum wherein an aluminum-based heat exchanger tube and an aluminum-based fin are held in brazed relation to each other by the use of a brazing composition, characterized in that a mixed diffusion layer composed of a mixture of silicon and zinc is formed on an outer surface of the heat exchanger tube, and the fin is formed by an aluminum-based material containing zinc, which zinc is used for formation of a part of the mixed diffusion layer.

Furthermore, the invention is directed to a process for the production of a heat exchanger core based on aluminum wherein an aluminum-based heat exchanger tube and an aluminum-based fin are held in brazed relation to each other by the use of a brazing composition, characterized in that the process comprises applying on to an outer surface of the heat exchanger tube a brazing composition derived from a mixture of silicon and fluorine type flux, preparing the fin formed of an aluminum-based zinc-containing material, and subsequently heating the heat exchanger tube and the fin at a given temperature, thereby bringing the exchanger tube and the fin into brazed relation to each other and also forming on an outer surface of the heat exchanger tube a mixed diffusion layer of silicon and zinc. In such instance, in the mixed diffusion layer composed of silicon and zinc and located on the heat exchanger surface, the maximum concentration is in the range of 0.5–1.5% in terms of silicon and of 0.4–3.0% in terms of zinc.

In the present invention, the above heat exchanger tube may be of an optional shape so long as it is based on aluminum. Preferably, such tube may be an extruded flattened tube based on aluminum and provided with a plurality of passages for supply of a heating medium. Besides and desirably, the concentration of zinc in the above described fin may be in the range of 1–5%.

According to the present invention, a mixture of silicon and fluorine type flux is employed as a brazing composition with the result that the heat exchanger tube is not required for Zn to previously adhere thereto, and a blank fin-forming Zn-containing material not clad with a brazing composition may be used to advantage. Part of the resulting fin is molten with the aid of a brazing composition during brazing, whereby the zinc contained in the fin is diffused over an outer surface of the heat exchanger tube so as to form thereover a mixed diffusion layer resulting from silicon and zinc.

Consequently, a zinc diffusion layer can be formed on an outer surface of the heat exchanger tube without zinc adhesion previously needed relative to the latter tube. This permits a heat exchanger core to be easily feasible with excellent corrosion resistance and brazing capability. Also advantageously, the fin does not need to be clad with a brazing composition and hence ensures easy formation and moreover avoids flashes or burres with ultimate production of a heat exchanger core of high quality. Improved productivity is further attainable with saved cost.

Figure 1:
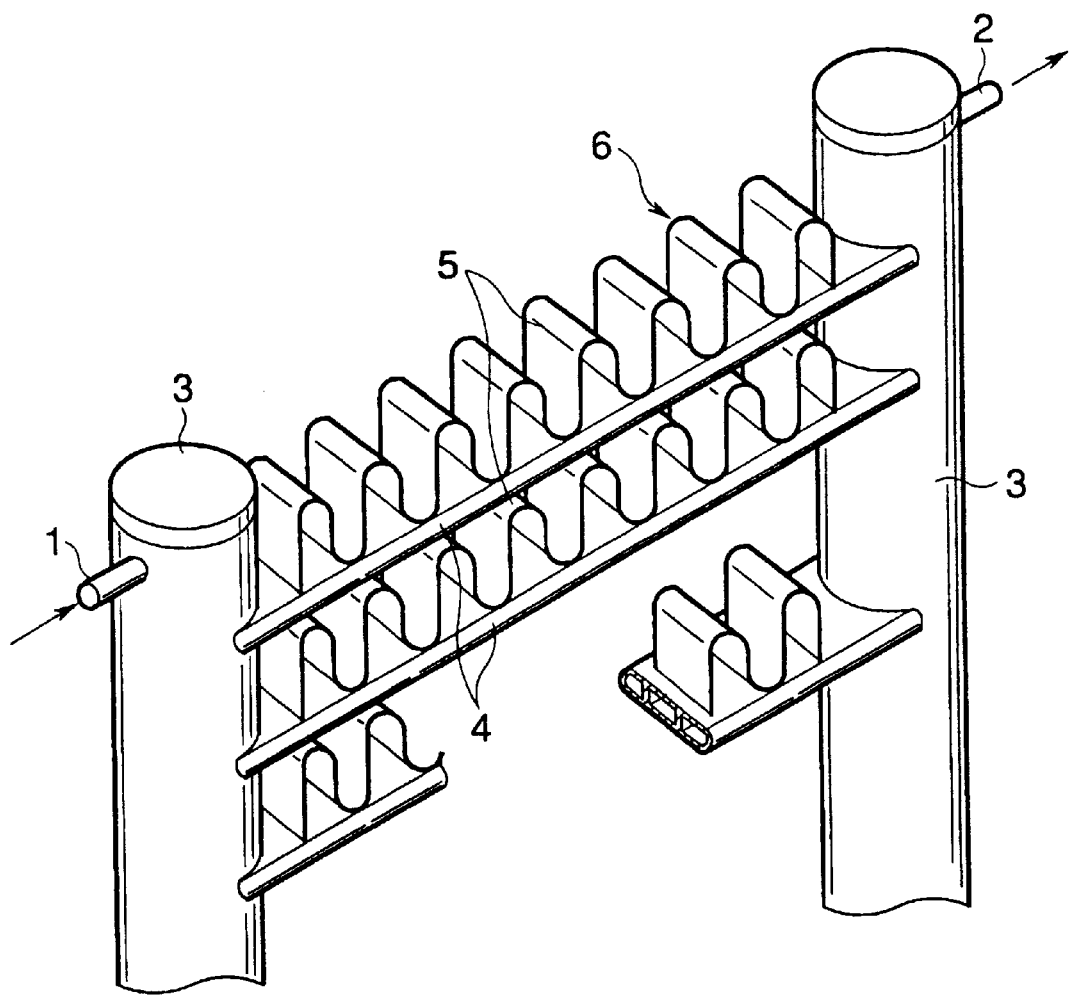
FIG. 1 illustrates, in perspective, important parts of one form of a heat exchanger having assembled therein the heat exchanger core according to the present invention.

In these views, reference numeral 4 refers to an extruded flattened tube (a heat exchanger tube), 5 to a corrugated fin, 6 to a heat exchanger core, 7 to a brazing composition and 8 to a diffusion layer of Si and Zn.

DETAILED DESCRIPTION OF THE INVENTION

With reference to the accompanying drawings, the present invention is described below in respect of its several embodiments.

FIG. 1 is a perspective view showing important parts of one form of a heat exchanger having assembled therein the heat exchanger core according to the invention.

The above heat exchanger is constructed with a pair of header tubes 3 placed in a spaced opposed posture and having a heating medium inlet 1 or a heating medium outlet 2, a plurality of extruded flattened tubes 4 serving as heat exchanger tubes, the extruded flattened tubes being arranged in parallel with each other and communicating with the header tubes 3, and fins such as for example corrugated fins 5 interposed between the extruded flattened tubes 4. In the heat exchanger thus assembled, the header tubes 3 and the extruded flattened tubes 4 are formed by an extruded shape based on aluminum, and the corrugated fins 5 are formed by flexing an aluminum-based plate material into alternate furrows and ridges or into a wavy configuration. The header tubes 3, the extruded flattened tubes 4 and the corrugated fins 5 are brought into integrally brazed relation to one another with use of a brazing composition (a brazing material) so that a heat exchanger is produced.

In that case, a heat exchanger core 6 made up of the extruded flattened tubes 4 and the corrugated fins 5 are formed by those aluminum-based extruded flattened tubes (JIS A1050 for example) which are not pretreated with adhesion of zinc (Zn), and the corrugated fins 5 are formed by an aluminum-based Zn-containing plate material not clad with a brazing material. As the brazing material, a mixture of powdered silicon (Si) and powdered fluorine type flux, or a mixture of powdered Si, powdered Zn and powdered fluorine type flux has been in common use. Here, the fluorine type flux may be a composition for example of KA1F4, K2A1F5.H2O or K3AlF6. This sort of fluorine type flux is desirable since it is unlike a chloride and immune from being corrosive to aluminum. The ratio of Si to flux (% by weight) is set to be Si:flux=1:2.

Figure 2:
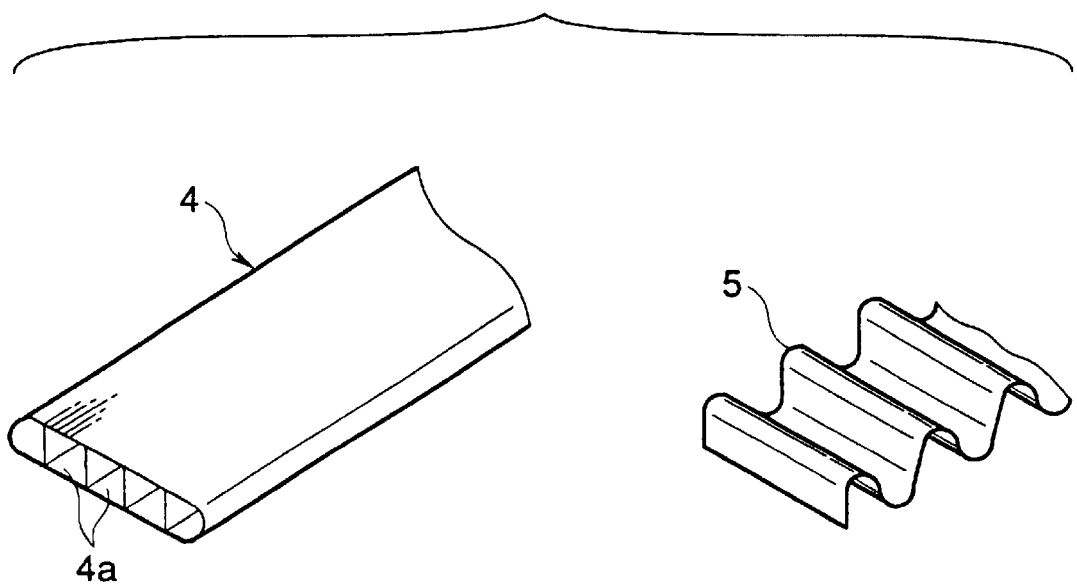
FIG. 2 is a perspective view showing each of an extruded flattened tube and a corrugated fin which have embodied the invention.

In order to produce the above heat exchanger core 6, a first process step lies in preparing, as seen in FIG. 2, the extruded flattened tubes 4 based on aluminum and having defined therein a plurality of passages for running of a heating medium and the corrugated fins 5 flexed in wavy arrangement and containing Zn. To this end, the corrugated fins 5 are derived from flexing of a Zn-containing aluminum-based plate material (JIS A3NO3 for example) into a wavy shape with use of a working roll. In such instance, the working roll is less susceptible to abrasion than in the case of a brazing material-clad brazing sheet. Another advantage is that no flashes nor burres occur even when a louver or the like is worked and mounted on the fins. This contributes to enhanced quality of the fins.

Figure 3:
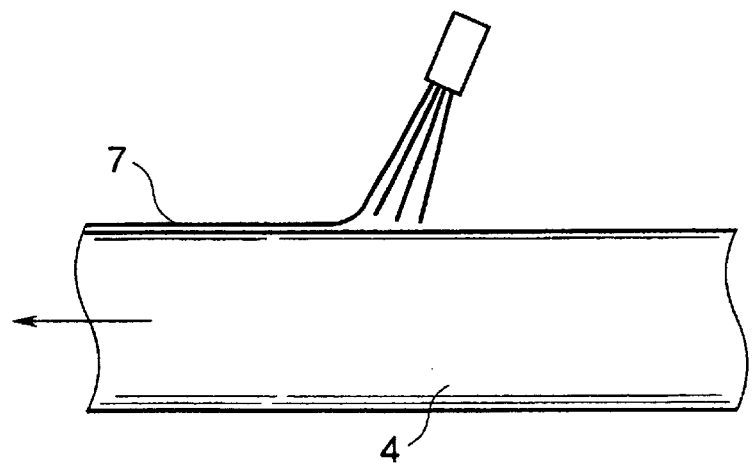
FIG. 3 is a cross-sectional view showing the manner in which a brazing composition is applied on to an extruded flattened tube in accordance with the invention.
Figure 4:
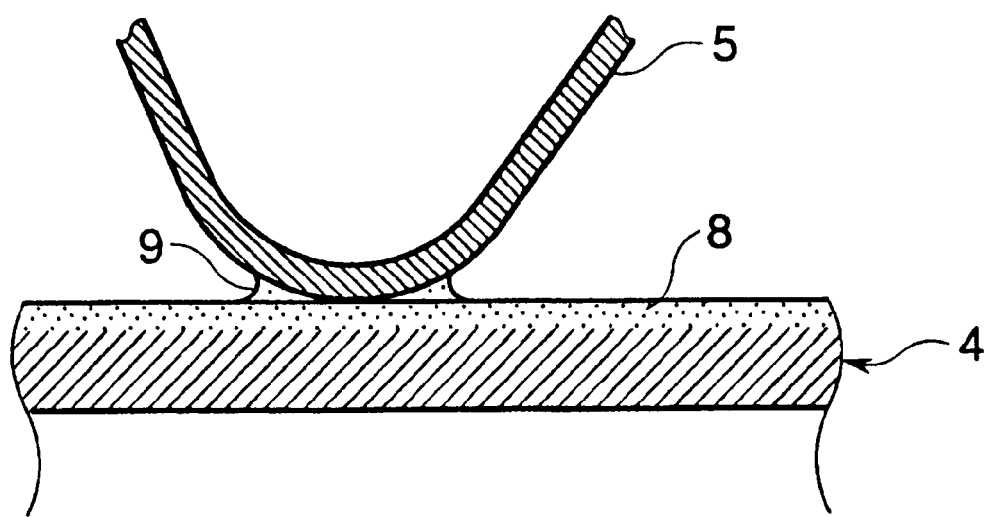
FIG. 4 is a cross-sectional view, partly enlarged, of the manner in which a heat exchanger tube and a fin are brought into brazed relation to each other in accordance with the invention.

A brazing composition 7 is thereafter applied on to a surface of the extruded flattened tube 4, as shown in FIG. 3, by the use of a binder such as for example a thermoplastic acrylic resin or the like. The application of this brazing composition to the extruded flattened tube 4 may be effected for example by spray-coating a mixed slurry of the binder and the brazing composition, or by immersing the extruded flattened tube 4 in a mixed slurry of the binder and the brazing composition and then by pulling up the tube vertically from the slurry to thereby remove excess slurry.

Next, the extruded flattened tube 4 so loaded with the brazing composition and the Zn-containing corrugated fins 5 are incorporated with and fixed to each other with use of a tool, not shown, or are fixed to each other by attachment to the header tubes 3. By subsequent heating at a predetermined temperature of higher than 590° C. for example in a heating oven or the like, the brazing composition is caused to melt to bring the extruded flattened tube 4 and the corrugated fins 5 into integrally brazed relation to each other. During the brazing operation, part of the corrugated fin 5 melts by the action of the brazing composition with the consequence that the Zn contained in the corrugated fin 5 diffuses over an outer surface of the extruded flattened tube 4, ultimately cooperating with the Si contained in the brazing composition in forming a diffusion layer 8 of Si and Zn over the outer surface of the flattened tube 4. The extruded flattened tube 4 and the corrugated fins 5 are further held in integrally connected relation to each other with a fillet 9 of an Al—Si—Zn alloy interposed therebetween. With the diffusion layer 8 of Si and Zn formed over the outer surface of the extruded flattened tube 4, the resultant heat exchanger core 6 is resistant to corrosion.

Now and here, explanation is offered as to those experiments made to evaluate the brazing capability and corrosion resistance of the heat exchanger core according to the present invention as compared to those of the aluminum-based heat exchanger core of the prior art.

⊙ starting materials
★ extruded flattened tubes
  (1) material: JIS A1050
    : JIS A1050+arc spray coating of Zn (target amount of Zn 8 g/m²)
    : NE alloy (modified A1050 alloy) (composition: 0.05% Si, 0.18% Fe, 0.4% Cu, 0.02% Zn and 0.04% Zr)

(2) shape: outside dimension (width×wall thickness)= 19.2 mm×1.93 mm (one-sided wall thickness: 0.4 mm)

★ fins
(1) material: blank material (JIS A3NO3 +content of Zn 0–4.0%)
   brazing sheet (A4343+1.0% Zn/3NO3+1.5% Zn/A4343+1.0% Zn)
(2) shape: (width×wall thickness)=21.1 mm×0.1 mm ★ brazing compositions
(1) powdered Si+powdered fluorine type flux+binder total amount of adhesion: 16 g/m$^2$ ◉ brazing conditions
current operating conditions: in nitrogen atmosphere (amount of nitrogen: 40 m$^3$/hour)
heating speed: 30° C./minute In regard to Comparative Examples 1 and 2 and Examples 1–4 in which the above extruded flattened tube 4 was fixedly razed with a blank fin material (of a content of Zn 0–4.0%) by the use of the above brazing composition and also in regard to Comparative Brazing Methods 1 and 2 (Current Brazing), details of which are shown in Table 1, a portion of junction between the extruded flattened tube 4 and the fin was cut and checked. The results of brazing capability are obtained as tabulated in Table 2.

Further evaluation was made of corrosion resistance for the finished brazed product by the CASS test (JIS H8681). The results are tabulated in Table 2.

Moreover, the extruded flattened tube 4 was cross-sectionally observed by means of a X-Ray microanalyzer (XMA) in order to inspect the diffusion states of Zn and Si. The results are tabulated in Table 2.

TABLE 1

| | Fin material | Extruded flattened tube | Brazing composition |
|---|---|---|---|
| Comparative example 1 | Blank fin material (Content of Zn; 0%) | A1050 | Powdered Si + Brazing flux + Binder Adhesion amount; 16 g/m2 |
| Comparative example 2 | Blank fin material (Content of Zn; 0.8%) | A1050 | Powdered Si + Brazing flux + Binder Adhesion amount; 16 g/m$^2$ |
| Example 1 | Blank fin material (Content of Zn; 1.2%) | A1050 | Powdered Si + Brazing flux + Binder Adhesion amount; 16 g/m$^2$ |
| Example 2 | Blank fin material (Content of Zn; 2.0%) | A1050 | Powdered Si + Brazing flux + Binder Adhesion amount; 16 g/m$^2$ |
| Example 3 | Blank fin material (Content of Zn; 2.0%) | NB alloy (0.4% Cu containing alloy) | Powdered Si + Brazing flux + Binder Adhesion amount; 16 g/m$^2$ |
| Example 4 | Blank fin material (Content of Zn; 5.0%) | A1050 | Powdered Si + Brazing flux + Binder Adhesion amount; 16 g/m$^2$ |
| Comparative brazing method-1 | Fin matetial of brazing sheet (Content of Zn; 1.5%) | A1050 | |
| Comparative brazing method-2 | Fin material of brazing sheet (Content of Zn; 1.5%) | A1050 + Zn-spray coating (Target amount of Zn; 8 g/m$^2$) | |

TABLE 2

| | | Diffusion state | | Evaluation result of corrosion resistance by CASS test | | |
|---|---|---|---|---|---|---|
| | Brazing capability | Diffusion state of Zn | Diffusion state of Si | 500 hr | 1000 hr | 1500 hr |
| Comparative example 1 | Good | Surface concentration; Nil Diffusion depth; Nil | Surface concentration; 1.1% Diffusion depth; 70 μm | ◉ | X | X |
| Comparative example 2 | Good | Surface concentration; 0.3% Diffusion depth; 76 μm | Surface concentration; 1.0% Diffusion depth; 68 μm | ◉ | ○ | X |
| Example 1 | Good | Surface concentration; 0.6% Diffusion depth; 72 μm | Surface concentration; 0.8% Diffusion depth; 78 μm | ◉ | ○ | ○ |
| Example 2 | Good | Surface concentration; 1.1% Diffusion depth; 74 μm | Surface concentration; 0.9% Diffusion depth; 72 μm | ◉ | ○ | ○ |
| Example 3 | Good | Surface concentration; 1.0% Diffusion depth; 79 μm | Surface concentration; 1.0% Diffusion depth; 67 μm | ◉ | ◉ | ○ |
| Example 4 | Good | Surtace concentration; 2.2% Diffusion depth; 80 μm | Surface concentration; 0.8% Diffusion depth; 73 μm | ◉ | ◉ | ○ |
| Comparative brazing method-1 | Good | Surface concentration; Nil Diffusion depth; Nil | Surface concentration; Nil Diffusion depth; Nil | X | X | X |
| Comparative brazing method-2 | Good | Surface concentration; 2.3% Diffusion depth; 84: μm | Surface concentration; Nil Diffusion depth; Nil | ◉ | ○ | X |

Place at which to have measured diffusion depth: between two fins
◉: Pitting depth 200 μm or below
○: No path through (pitting depth between above 200 μm and below 400 μm)
X: Path through The above experimental results show that all of the brazed states obtained in Examples 1–4 are comparable favorably to those of the heat exchanger core using a brazing sheet in current use and that the brazing percentages in Examples 1–4 are larger than 99.5%.

Upon inspection of the brazed products by the CASS test, Comparative Examples 1 and 2 as well as Current Brazing Methods 1 and 2 posed path through up to a length of testing time for 1500 hours, whereas the products of Examples 1–4 have proved to be free from such holes even after lapse of such testing time.

Furthermore, on examination of the diffusion states of Zn and Si (both surface concentration and diffusion depth), the diffusion state of Zn in Examples 1–4 is 0.6%–2.2% and 72 $\mu$m–80 $\mu$m, and the diffusion state of Si is 0.8%–1.0% and 67 $\mu$m–78 $\mu$m.

From the foregoing experiments, it has been found that a heat exchanger core, obtained from a fin based on aluminum and having a content of Zn of 1.2%–4.0% and an extruded flattened tube based on aluminum and having omitted adhesion of Zn in advance which have been brazed with each other by the use of a brazing composition composed of a mixture of powdered Si and fluorine type flux, is capable of affording brazing capability and corrosion resistance similar to or higher than those of the heat exchanger core currently practiced in the art. Though not expressly given in the experimental results mentioned above, lower contents of Zn in the fin material than 1% bring about a surface diffusion concentration of Zn of below 0.4%, thus resulting in insufficient anodic action in the Zn diffusion layer. Conversely, higher contents of Zn than 5% render the fin material itself remarkably corrosive with the consequence that the finished heat exchanger involves shortened service life and also that the resultant fin reduces in its material strength at high temperatures and hence tends to buckle when in brazing. Therefore, in the case where Zn is present in a content of 1.0%–5.0% in the fin material, brazing capability and corrosion resistance are attainable at such magnitudes as are equivalent to or greater than those of the current heat exchanger core.

Though not demonstrated in the above experimental results, it has also been found from this series of experimental results that the larger is the amount of Zn to be added, the Zn diffusion layer can be formed at a higher concentration, and greater resistance to corrosion may thus be expected and that since the Si diffusion layer is respectful of a pitting corrosion-inducing potential on the side of an extruded flattened tube, higher corrosion resistance may be attainable than in an extruded flattened tube free of the Si diffusion layer.

INDUSTRIAL APPLICABILITY

As described and shown hereinabove, the present invention enables a mixture of silicon and fluorine type flux to be employed as a brazing composition so that a heat exchanger tube is not required for adhesion of Zn in advance, and a blank fin material containing Zn but not clad with a brazing composition can be used in forming a fin. Part of the fin thus melts when undergoing the action of the brazing composition, whereby the zinc contained in the fin diffuses over an outer surface of the heat exchanger tube and hence functions as forming a diffusion layer composed of a mixture of silicon and zinc over such outer surface.

Accordingly, a zinc diffusion layer can be formed on an outer surface of the heat exchanger tube without zinc adhesion previously needed relative to the latter tube. This in turn allows a heat exchanger core to be easily provided with high corrosion resistance and high brazing capability. Another advantage is that the fin does not need to be clad with a brazing composition, hence ensuring easy workability and moreover avoiding flashes or burres, with eventual provision of a heat exchanger core of high quality. As a further advantage, high productivity is feasible with cost savings.

What is claimed is:

1. A process for the production of a heat exchanger core (6) based on aluminum wherein an aluminum-based extruded flattened heat exchanger tube (4) and an aluminum-based zinc-containing fin (5) are held in brazed relation to each other by the use of a brazing composition (7), characterized in that said heat exchanger tube is not pretreated with adhesion of zinc, and the process comprises applying on to the outer surface of said heat exchanger tube a brazing composition comprising fluorine type flux and a brazing material consisting essentially of silicon, preparing said fin formed of an aluminum-based zinc-containing material, and subsequently heating said heat exchanger tube and said fin at a given temperature, thereby bringing said heat exchanger tube and said fin into brazed relation to each other and also forming on the outer surface of said heat exchanger tube a mixed diffusion layer (8) of silicon and zinc, wherein the zinc contained in said fin combines with the silicon in said brazing composition during the brazing operation to form said mixed diffusion layer.

2. A process for the production of the heat exchanger core based on aluminum as defined in claim 1, characterized in that the concentration of zinc in said fin is in the range of 1–5 wt. %.

* * * * *